Figure 1:
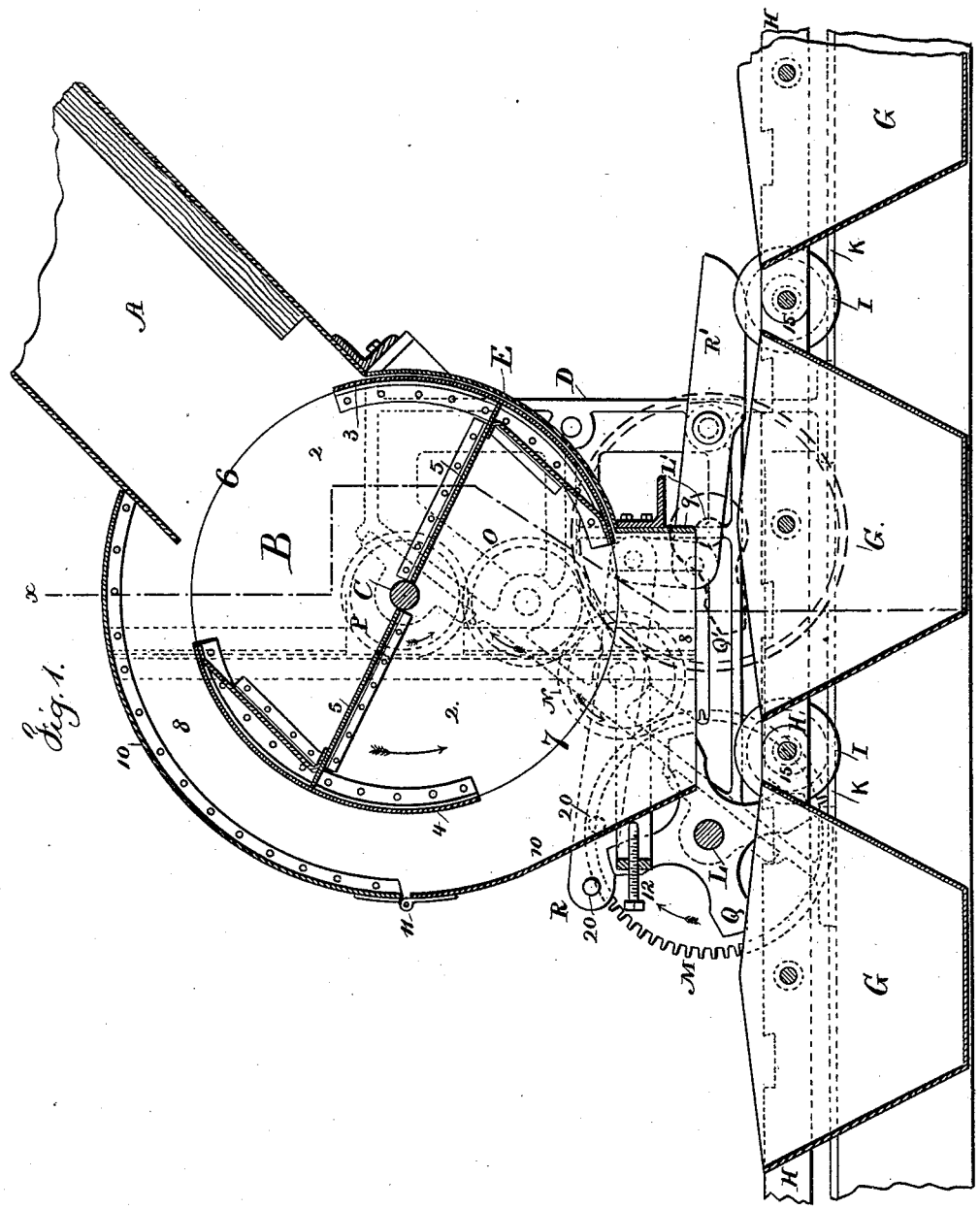

(No Model.)

3 Sheets—Sheet 1.

C. W. HUNT.
MECHANISM FOR MEASURING COAL.

No. 428,916. Patented May 27, 1890.

Witnesses
Chas H Smith
J. Staib

Inventor
Charles W. Hunt.
per Lemuel W. Serrell
atty

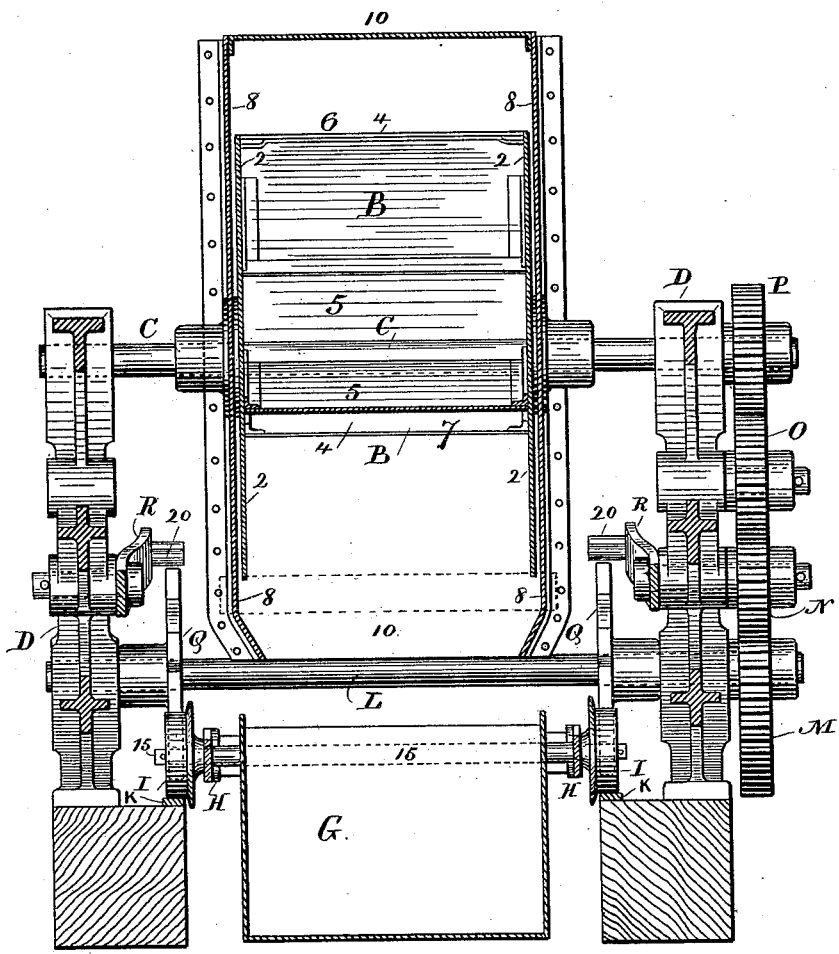

(No Model.) 3 Sheets—Sheet 3.
C. W. HUNT.
MECHANISM FOR MEASURING COAL.
No. 428,916. Patented May 27, 1890.
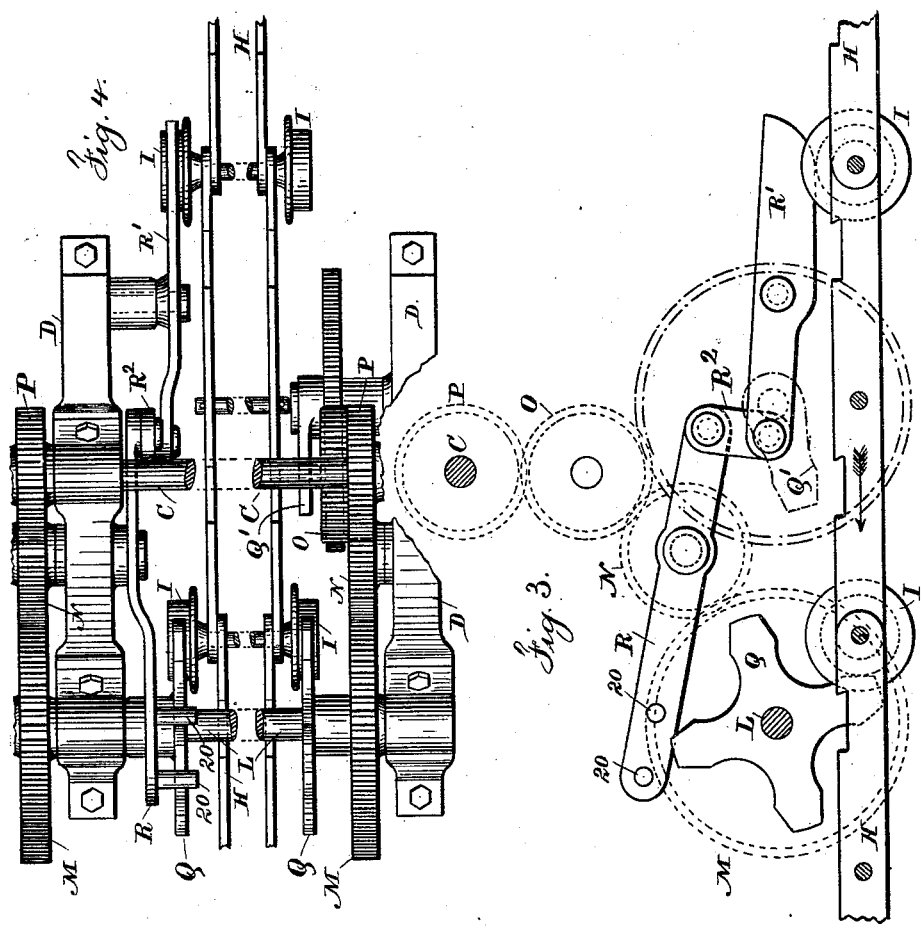

UNITED STATES PATENT OFFICE.

CHARLES W. HUNT, OF WEST NEW BRIGHTON, ASSIGNOR TO THE C. W. HUNT COMPANY, OF NEW YORK, N. Y.

MECHANISM FOR MEASURING COAL.

SPECIFICATION forming part of Letters Patent No. 428,916, dated May 27, 1890.

Application filed February 3, 1890. Serial No. 339,061. (No model.)

*To all whom it may concern:*

Be it known that I, CHARLES W. HUNT, a citizen of the United States, residing at West New Brighton, in the county of Richmond and State of New York, have invented an Improvement in Measuring and Loading Mechanism for Coal and other Articles, of which the following is a specification.

The object of this invention is to supply coal and other material in a regular proportion from a hopper or chute to the buckets of a conveyer, the measuring and loading device corresponding in its motion to the movement of the cars or buckets receiving such material.

My present improvement is primarily intended for use in a conveyer in which endless chains are made use of connected with buckets, and the measuring device discharges into each bucket in succession the proper amount for such bucket, thereby not only preventing loss by the material becoming scattered, but also forming a measure for ascertaining approximately the number of bushels of coal, grain, or other material discharged and conveyed to the point of delivery and the weight of such material.

In the drawings, Figure 1 is a vertical section representing my loading and measuring device. Fig. 2 is a vertical transverse section at the line $x\,x$, representing the measuring device and the conveying-buckets. Fig. 3 is a diagrammatic representation of the locking-lever and gearing, and Fig. 4 is a plan view of the levers and gears on the opposite sides of the apparatus.

The coal, grain, or other material is supplied into a chute or hopper A, at the bottom of which is a rotary measure B, supported on an axis C by the side frames D, of any suitable shape or construction. The rotary measure B has circular ends 2 and cylindrical segments 3 4 between such ends and a central partition 5, so that there are two mouths 6 and 7 at opposite sides of the cylinder and between the respective cylindrical segments 3 and 4, and there is a stationary metallic plate E, formed as a segment of a cylinder and extending outside of the rotary measure B from below the lower end of the hopper A down to the delivery-opening below the cylinder B, which opening is bounded by the side plates 8 and end plate 9, and these side plates 8 extend up at each end of the rotary measure B and rise above the same and unite with the chute or hopper, and, being contiguous to the ends of the rotary measure, prevent the coal or other material falling down at the ends of such rotary measure, and there is a stationary inclosing-plate 10 between the side plates 8 and extending down to the bottom below the rotary measure either as one stationary plate or preferably the lower half of this inclosing-plate is a separate piece hinged to the upper part at 11 and adapted to pass in between the side plates 8, and at 12 is an adjusting-screw, so that the lower end of this inclosing-plate 10 can be moved nearer to or farther from the measuring-cylinder to regulate the opening through which the material is discharged from such rotary measure, and I have represented a bucket G below the opening for the reception of the coal or other material. The plate 10 acts as deflector, and it may be adjusted at its lower end in any suitable manner to direct the coal to the proper place as discharged from the measure. The measuring-cylinder is to be rotated by any suitable mechanism in one direction, or oscillated first one way and then the other. I have represented by full lines the devices for rotating the measuring-cylinder progressively in one direction and by dotted lines in Fig. 1 means for oscillating the measuring-cylinder or turning it back. The movement of the chain, as hereinafter described, gives motion to the measuring-cylinder itself. This measure B may be rotated progressively in the direction indicated by the arrow, Fig. 1, and the length of the cylinder-segment E is greater than the width of either mouth 6 or 7; hence as the cylindrical segment 3 passes upwardly adjacent to the coal or other material in the chute A the advancing edge of such segment lifts the material, and such material does not become wedged as the parts turn, and before the back end of the cylinder-segment 3 reaches the upper edge of the stationary segment E the advancing end of the segment 4 of the rotary measure has passed above the lower end of such stationary segment E, and as the mouth 7 comes opposite to the lower end of the hopper A the material runs into the rotary measure, filling one compartment of the same, and the further downflow of the material from the hopper A is arrested by the cylindrical segment 4 as it rises by the movement of the respective parts, and in this manner the compartments at opposite sides of the partition 5 of the rotary measure are filled in succession.

As the rotary measure is turned, the coal or other material is discharged from the compartments in succession and falls away through the opening or mouth between the plates 8 9 10, and when the rotary measure is used with an endless chain of buckets or conveyers I prefer to give motion to the rotary measure by the chain of conveyers, as next described.

The buckets G are suspended by the cross-shafts 15 between the links H, and there are wheels or rollers I upon the ends of the cross-shafts 15, and these rollers I run upon stationary tracks or rails K, and there is a cross-shaft L between the side frames D, having a gear-wheel M, that is geared to the axis C of the rotary measure. I have shown and prefer to use the train of gearing N O P, the gear P being half the size of the gear M; hence the rotary measure B will make two revolutions for one revolution of the shaft L, and upon the shaft L is a star-wheel Q, having four arms, and these are in the path of the rollers I; hence as the conveyer formed of the chains of buckets is moved along progressively the star-wheel Q is turned one-quarter of a rotation by the passage of one of the rollers I, and this gives to the rotary measure a half of a rotation, and the parts are so placed that the contents of one receptacle in the rotary measure are discharged into one of the buckets, and these operations are continuous and progressive as the chain of buckets is moved along.

In order to prevent the weight of the material in the rotary measure turning the same and the train of gearing and the star-wheel, a suitable pawl mechanism is made use of. I prefer a compound lever R R', with two pins 20, that come down one at each side of the top arm of the star-wheel to hold the same in position as one of the wheels I passes away from beneath the nearly horizontal arm of the star-wheel, and in this manner the rotary measure and parts are held in position until another roller I is adjacent to the lower arm of the star-wheel, at which moment the part R' of the compound lever is lifted by one of the rollers I running under the same, and the opposite end of the compound lever R R' is raised, lifting the pins 20 and allowing the star-wheel to be turned by the action of the roller I, that is in contact with the lower arm of such wheel, and the movements of the parts are repeated.

The compound lever R R' may be of any desired form. I have shown the link R² as connecting the two parts thereof, so as to lift the pins 20 at one end of the compound lever when the other end of such lever is lifted by the wheels or rollers I.

It will be understood that it is preferable to provide two star-wheels Q upon the shaft L, so that both chains of the endless conveyer will be acted upon uniformly and a parallelism of the parts maintained.

Having described the operation of the machine when the measure is turned progressively in one direction, I will explain how the measure can be oscillated by turning it back and then forward instead of rotating continuously in one direction. The cylinder in this case is to have but one mouth or opening of the proper size to receive the material, and the balance of the cylinder is closed. It may consist of two ends of larger diameter than the cylinder proper, instead of the stationary ends 8, to prevent the coal or material from falling over sidewise, and the stationary apron or inclosure 10 may be used to prevent the material from falling forward and scattering in the track of the conveyer and to direct the material all into the buckets. In order to give a forward and backward movement to the measuring-cylinder, I employ a second shaft or gudgeon L', (see dotted lines, Fig. 1, and plan view, Fig. 4,) and on this shaft or gudgeon is an arm Q', which, when in one position, will lie in the path of the wheels of the conveyer. The shafts L L' are placed the proper distance apart lengthwise of the track of the conveyer, and each bucket of the conveyer has one pair of wheels, and as said wheels move along they will engage first with the arm Q' on the shaft L' and move it one-quarter of a revolution, which will turn the cylinder B one-half of a revolution in the opposite direction to the arrow. The material will now flow into the mouth or opening of the cylinder and fill the compartment or cylinder with the material, and as the wheels I engage and move the arms Q on the shaft L the said arms Q and gearing will revolve the cylinder in the direction of the arrow and deliver its charge of material into the bucket of the conveyer, so that each pair of wheels of the conveyer will first place the cylinder into position to receive its charge of material from the hopper or bin and chute, and then the said wheels of the conveyer passing on farther, as the bucket is brought into position to receive the charge from the cylinder, engage the arms Q, and the cylinder B is revolved and its contents delivered into the bucket of the conveyer, and so the operation continues. In consequence of the parts being all geared together the arms Q' and Q move in opposite directions, and one is placed in position to be acted upon as the other is moved by the wheels of the conveyer. I prefer to utilize the wheels of the conveyer to operate the automatic measuring and filling device; but some other member of the moving conveyer may give motion to the automatic measuring and filling devices.

It is to be understood that in consequence of the rotary measure intervening between the supply hopper or chute and the buckets in the conveyer the coal or other material cannot continue to run and overflow the bucket should the bucket or conveyer stop moving, and when the parts are started again the rotary measure only supplies to the bucket the proper quantity of coal or other material; hence there is no loss or scattering of the material in stopping or starting.

I claim as my invention—

1. The combination, with the supply-bin hopper or chute and a conveyer having buckets or receptacles, of a circular measuring-cylinder intervening between the said supply-chute and conveyer-receptacles, and mechanism for rotating the measuring-cylinder automatically from the conveyer, so as to deliver material in a regular quantity into each passing receptacle of the conveyer, substantially as set forth.

2. The rotary measure having an axis C, circular ends 2, a central partition 5, and the cylindrical segments 3 and 4, in combination with the chute or hopper A, the stationary segment E, adjacent to the rotary measure and below the chute or hopper, the side plates 8, and the inclosing plate or apron 10, substantially as set forth.

3. The rotary measure, in combination with the supply chute or hopper, the segment E, and the adjustable plate or deflector 10, to deliver the material at the proper point, substantially as set forth.

4. The combination, with an endless chain of conveyer-buckets, of a rotary measure having circular ends, a central partition, and cylindrical segments 3 and 4, a supply-hopper, a cross-shaft and star-wheel acted upon by the conveyer, and gearing between such shaft and the shaft of the rotary measure, substantially as set forth.

5. The combination, with a moving conveyer having buckets and a chute or hopper for the supply of coal or other material, of a measure at the lower end of the hopper and intervening between the same and the buckets of the conveyer, and mechanism for moving the measure in harmony with the conveyer, so that the contents of the measure are delivered into the buckets in succession, substantially as set forth.

6. The combination, with the endless chain of conveyer-buckets, the rollers, and tracks for the same, of a cylindrical measure having an opening for receiving the material, a supply hopper or chute, cross-shafts and star-wheels or projections in the path of the rollers of the conveyer, and gearing between the said star-shafts and the shaft of the measuring-cylinder to oscillate the said cylinder forward and back and to deliver the material into the buckets of the conveyer, substantially as and for the purpose set forth.

Signed by me this 25th day of January, 1890.

CHAS. W. HUNT.

Witnesses:
 GEO. T. PINCKNEY,
 HAROLD SERRELL.